J. A. BASSETT.
Carbureter.
No. 81,974.
Patented Sept. 8, 1868.
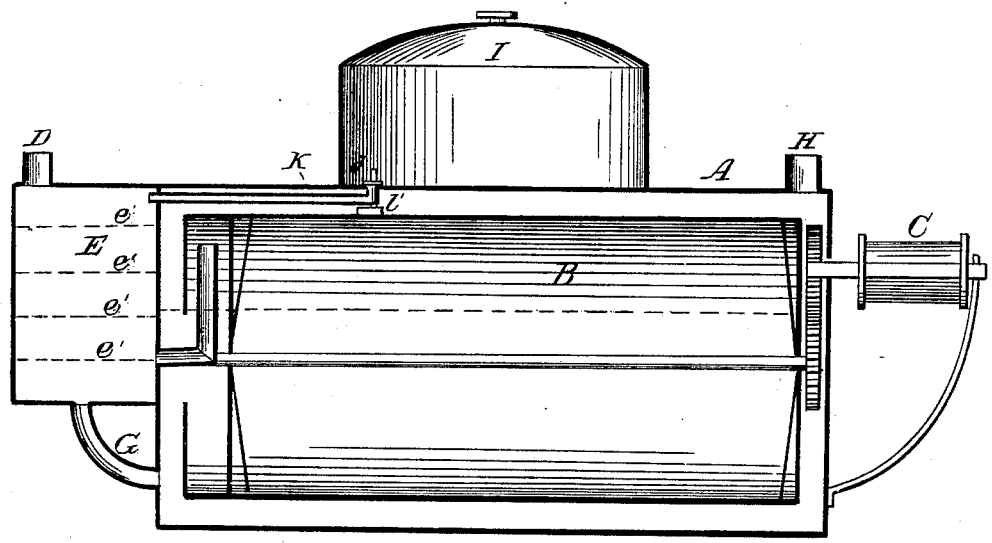
Witnesses.
S. R. Nichols
J. Smith
Inventor
John A Bassett

UNITED STATES PATENT OFFICE.

JOHN A. BASSETT, OF SALEM, MASSACHUSETTS.

APPARATUS FOR THE MANUFACTURE OF HEATING AND ILLUMINATING GAS.

Specification forming part of Letters Patent No. 81,974, dated September 8, 1868.

*To all whom it may concern:*

Be it known that I, JOHN A. BASSETT, of Salem, in the county of Essex and State of Massachusetts, have invented new and useful Improvements in Apparatus for Carbureting Gases; and I do hereby declare that the following is a full, clear, and exact description thereof, reference being had to the drawing presented with this specification.

My apparatus consists of an air-pump and carbureter combined, the air-pump being similar in construction to the wet meter used for measuring gas. At the inlet of this pump I place a chamber containing a series of perforated diaphragms, so that all the air which is drawn in by the pump is compelled to pass through this chamber. At the top of the apparatus, or in any suitable place, I construct a reservoir for containing a supply of hydrocarbon liquid. At the bottom of this reservoir I place a valve, so connected with the pump-shaft that at each revolution of the shaft a graduated quantity of the hydrocarbon passes into the carbureter, and thus the level of the hydrocarbon necessary to maintain the proper seal for working the pump is obtained. The supply is in direct proportion to the evaporation. This is important, because unless, as the hydrocarbon evaporates, a constant supply is maintained, the pump ceases to draw in the air.

In the drawing, A represents the case of the pump. B is the pump-cylinder, which is revolved by a weight attached by a rope to the drum C, which is about the level of the hydrocarbon. D is the outlet-pipe for air. The air passes down through the chamber E, through the perforated plates $e'$ $e'$, and through the pipe G into the chamber of the pump. It passes out at the outlet-pipe H, after carburation, to the burners. I is the reservoir of hydrocarbon. J is a valve covering the pipe K, which communicates with the chamber E. The valve J is operated by the cam $l'$, placed on the shaft $l$ of the pump-cylinder B, and at each revolution of the cylinder B a quantity of the hydrocarbon passes down the pipe K into the chamber E, where it meets and is mingled with the current of air passing through the diaphragms $e'$ $e'$, so that the fresh hydrocarbon, before it is deprived of its most volatile constituents, accomplishes a portion of the enriching of the air, which is afterward finished by passing through the pump. The surplus liquid passes through the pipe $n$ into the pump-chamber.

What I claim, and desire to secure by Letters Patent, is—

1. The arrangement of the valve J, in connection with a reservoir of hydrocarbon liquid, for the purpose set forth.

2. The combination of the chamber E with the pump B, the chamber containing a series of foraminous diaphragms or fibrous material, for the purpose substantially as described.

JOHN A. BASSETT.

Witnesses:
   D. W. BOWDOIN,
   C. SEWALL.